United States Patent [19]

Overbury

[11] 4,035,804
[45] July 12, 1977

[54] SIMULATED DOPPLER NAVIGATIONAL SYSTEM WITH SECOND ORDER DIVERSITY

[75] Inventor: Francis G. Overbury, Cuffley, England

[73] Assignee: International Standard Electric Corporation, New York, N.Y.

[21] Appl. No.: 703,316

[22] Filed: July 8, 1976

[30] Foreign Application Priority Data

July 10, 1975 United Kingdom ............ 29040/75

[51] Int. Cl.² .............................................. G01S 1/40
[52] U.S. Cl. ...................... 343/106 D; 343/108 M; 343/113 DE
[58] Field of Search .... 343/106 D, 108 M, 113 DE

[56] References Cited

U.S. PATENT DOCUMENTS

| 3,626,419 | 12/1971 | Earp | 343/106 D |
|---|---|---|---|
| 3,670,337 | 6/1972 | Earp et al. | 343/108 M |
| 3,924,236 | 12/1975 | Earp et al. | 343/113 DE |

Primary Examiner—Maynard R. Wilbur
Assistant Examiner—Richard E. Berger
Attorney, Agent, or Firm—William T. O'Neil

[57] ABSTRACT

A simulated Doppler navigation beacon system providing second order spatial diversity with respect to excitation of its commutated 2-dimensional main (coordinate) array and a linear reference array. For elevation measurement, the main array excitation is advanced in elevation, one element at a time during each scan cycle, but the lateral (horizontal) excitation is varied pseudo-randomly in both main and reference arrays while maintaining the same lateral spatial relationship between the main and reference array element pair excited at any time. The reference array comprises a larger number of elements than the horizontal elements in said array and the adjacent group of reference elements excited during any scan cycle of the main array is shifted laterally for each succeeding main array scan cycle.

6 Claims, 3 Drawing Figures

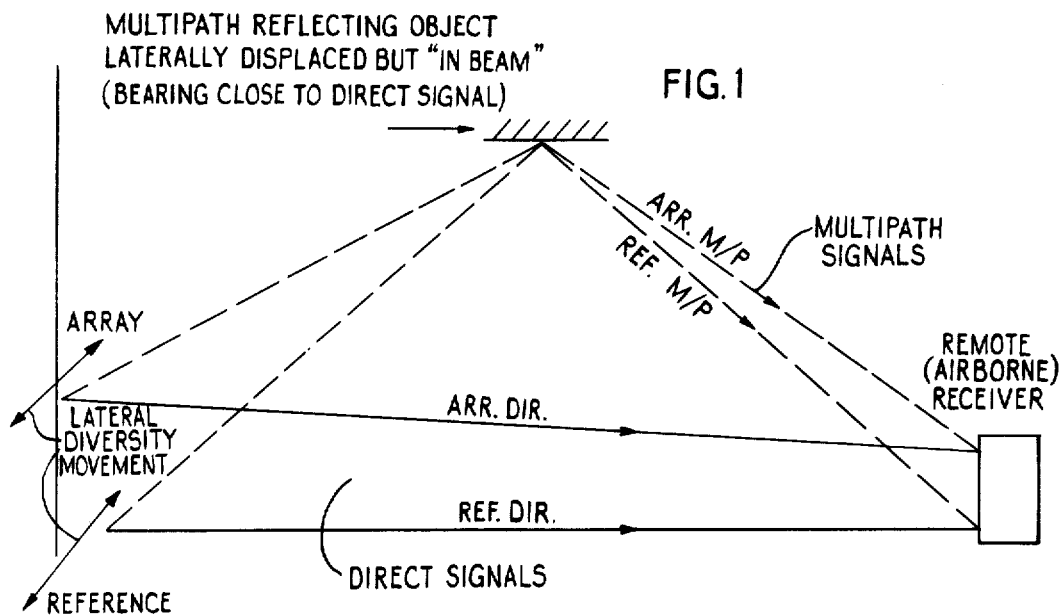
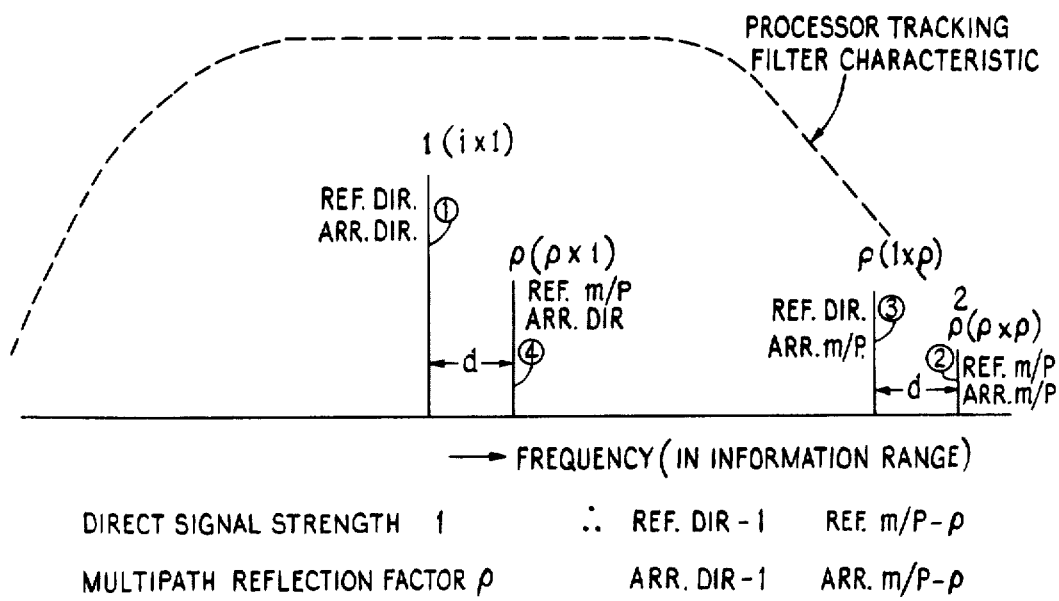

SIMULATED DOPPLER NAVIGATIONAL SYSTEM WITH SECOND ORDER DIVERSITY

BACKGROUND OF THE INVENTION

1. Field of the Invention

This invention relates to radio navigation systems generally, and more particularly to radio navigation systems which radiate simulated Doppler signals which effectively angle-code the transmissions for the benefit of a remote station deriving angle information therefrom.

2. Description of the Prior Art

The derivation of navigational information using the (simulated) Doppler technique as known in the prior art and as applied to a transmitting radio beacon basically involves movement of a source of radio frequency (typically of microwave frequency of 1 or more GHz) along an array of antennas. This movement or scan is simulated in practical systems by the sequential switching of the radio frequency source to each element in such a way as to represent constant velocity movement of the source along the axis of the array. In this way a simulated Doppler effect is produced which is unrelated to Doppler effect due to relative beacon/target actual motion. Two such arrangements are described in U.S. Pat. Nos. 3,626,419 and 3,670,337.

Depending on the cosine of the angle subtended by a remote station (airborne) receiver with respect to the array axis, a phase shift is imparted to the remotely received signal. The change of phase, as the contribution of each element follows the last, is observed by the remote receiver (and all other such receivers in the service sector of the beacon at appropriately different values according to their respective angles). In a given receiver, the total of these contributions constituting a scan entity, is analyzed by suitable processing means to obtain the angle (bearing or elevation from a horizontal axis or a vertical axis array respectively).

In practice two sources are used for the transmission of information in this Doppler navigation beacon format, the beat between them being extracted for derivation of Doppler coding at the remote location. As is well known in the germane prior art, the rationale for the use of two sources is the need for elimination of the effects of instabilities due to transmitter, receiver and aircraft motion. The two sources have been referred to as the reference and commutated (main array or information) components, but it is clear that the phase of the beat component at a remote receiving location is equally influenced by the phase of either signal, so that movement of either of these sources is equally effective in constituting a scan sequence.

It is also possible, therefore, to generate such a scan by commutation of both sources according to a predetermined program. Two such proposals are contained in U.S. Pat. No. 3,953,854 and U.S. Pat. application Ser. No. 574,853 filed May 6, 1975, now abandoned.

In addition to the Doppler Beacon application, the Doppler technique may be applied to a receiving array of antennas of $n$ radiating elements, as described in U.S. Pat. No. 3,924,236, in what may be termed an "inverse" Doppler system. In that type of system successive r.f. pulse signals are each received simultaneously by all the elements of the array, which for each received pulse, induce a series of $n$ simultaneous signals; the phase shift between successive signals in each series being determined by the angle of arrival of the corresponding signal with respect to the array axis.

The received signals may have been transmitted by an aircraft in the service sector of the array, or the aircraft may reflect pulse signals from separate illumination as in some radar systems.

Subsequent processing of each of the series of $n$ signals involves the use of a second frequency, offset from the information (Doppler frequency coded) signal series, generated at the receiving station for mixing with the information signal series to extract the Doppler beat frequency which is subsequently processed to determine the phase shift and hence the angle of arrival of the received pulses. Such devices, as a class, are sometimes referred to as synthetic aperture devices.

In both aforementioned types of Doppler systems, multipath signals may occur, by reflection, and where such multipath signals are not sufficiently spectrally removed in angular coding to be rejected by the tracking processor, errors may be introduced into normal angle indication. In both systems, the amplitude and sign of the resultant error is influenced by the relative phase (at information frequency) of desired (direct path) and multipath signals.

It is the aim of processes designed to reduce the effect of multipath to vary the relative phase of desired and undesired components by an amount which, over a scan or a time slot (predetermined number of scans), is able to produce some useful averaging of the basically phase-conscious error. Relative phase difference may in general be introduced between direct and multipath signals by a change in relative path length. One way of achieving this is by diversity, i.e. movement at the antenna array.

In co-pending U.S. Pat. application Ser. No. 597,369, filed July 21, 1975, there is described a co-ordinate array diversity scheme, applicable both to a Doppler transmitting beacon and to an inverse Doppler direction finding receiver. In that prior art device there is utilized an antenna scanning sequence which introduces a first order of diversity, which for example, in a vertical scanning transmitting Doppler beacon for elevation guidance, basically involves the simultaneous realization of the necessary constant velocity vertical separation of two radio frequency sources during each scan to generate the necessary information signal by direct path propagation to a receiver, with pseudo-random horizontal movement of the two sources at successive steps during each scan, the two sources moving sideways together to remain vertically aligned but along successively different vertical axes.

The results of prior art diversity and other multipath rejection system still leave something to be desired in respect to their ability to reject undesired signals. The manner in which the present invention significantly improves upon this situation will be evident as this description proceeds.

SUMMARY OF THE INVENTION

According to the invention there is provided radio navigation equipment including an arrangement of antenna elements, means for scanning said elements step-by-step a pair at a time, such that during each said scan the $x$ and $y$ orthogonal co-ordinates of the scanned elements given by $x_1y_1$ and $x_2y_2$ satisfy the conditions that $y_1-y_2$ being constant within the said scan, $x_1$ varying pseudo-randomly between successive steps of a said scan, and means effective at completion of a said scan to change $x_1$–$x_2$ pseudo-randomly. This program produces what may be characterized as double diversity.

BRIEF DESCRIPTION OF THE DRAWINGS

FIG. 1 is a geometric representation of the direct and multipath signal situation in equipment of the type to which the invention applies.

FIG. 2 is a spectral line and pass-band diagram for explanation of a characteristic of the apparatus of the invention.

DESCRIPTION OF THE PREFERRED EMBODIMENTS

Figure 3:
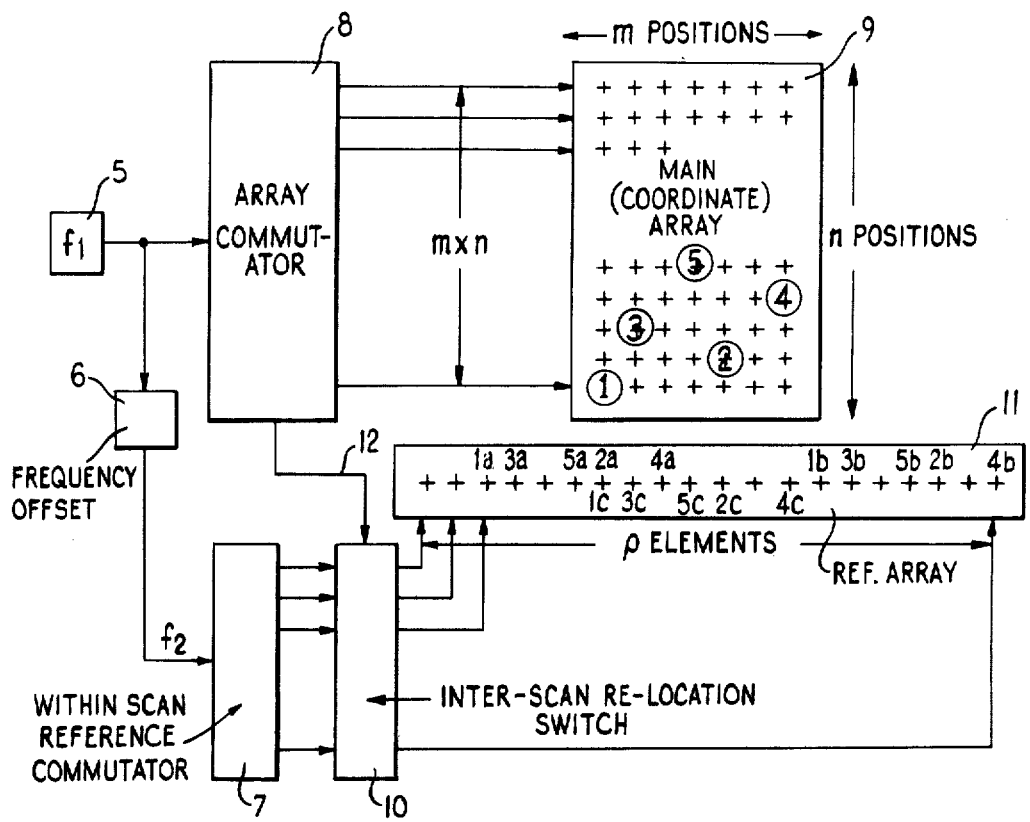
FIG. 3 is a schematic block diagram of an embodiment for practicing the invention.

FIG. 1 of the accompanying drawings shows a diagrammatic representation of a Doppler elevation system with a single mulipath reflector which, although prior art per se, is useful for development of an understanding of the invention. FIG. 1 is simplified in that the system is based on a fixed reference and associated commutated main array, with no movement of the reference radiator along the vertical guidance axis. The points to be discussed are however equally applicable where multiplicative movement of both sources is made.

The lateral movement shown represents equal movements of both sources at right angles to the guidance plane at the time the array radiators complete a cycle of scan. All four components shown in FIG. 1 are received by the aircraft receiver and will product in the detector. There are four components at information frequency which fall near the coding frequency of the required signal and may be accepted by the receiver processor, these being:

1. REF. DIR − ARR. DIR (The desired signal)
2. REF. M/P − ARR. M/P. (The basic Doppler code as seen at the M/P reflector)
3 and 4. Cross products, REF. DIR. − ARR. M/P and REF. M/P − ARR. DIR, respectively The first two components are the fundamental codes which would be seen at the remote (airborne) receiver site and at the multipath reflector. They are unaffected by the diversity in that they are derived by the coherent movement of the two sources (reference and main array elements) as a pair. Also it is important to note that their absolute phase at baseband within the scan does not vary rapidly with receiver position in the sector as these constituents travel as a pair from the arrays to their destination. The latter two are cross products between components, one of which has travelled direct and one arriving via the reflecting object. These are therefore necessarily influenced in phase by differential path length change whether due to aircraft motion or transmitter diversity movements.

Reference to FIG. 2 of the accompanying drawings shows all four components and their typical relative amplitude, assuming a reflection factor of $\rho$. The cross product components 3 and 4 appear removed from the basic direct signal and multipath signal frequencies 1 and 2 by an equal amount (frequency spacing) $d$ which is a function of the rate of change of differential path length. They are always on opposite sides of the basic code frequency. If by rapid diversity, as in the system described in the aforementioned U.S. Pat. application Ser. No. 597,369, the cross product components are thrown outside the range of the processor, the only residual components are:

1. REF. DIRECT − ARRAY. DIRECT (The desired signal)
2. REF. M/P − ARRAY. M/P (Basic coding of multipath).

As neither of these components have cross products, i.e. R.F. constituents which vary with relative path length, their phase does not change with diversity or aircraft movement (except for a very slow long distance phase variations determined by the wavelength at baseband frequency). Component 2 (FIG. 2) has strength $\rho^2$, and its phase is determined by the position of the reference radiator with respect to the array and the lateral separation of direct and multipath angles. The bias may lie anywhere between positive and negative peaks as determined by the phase of the $\rho^2$ term. In accordance with the invention, it is possible to reduce the effect of the $\rho^2$ element to a completely negligible amount by an additional diversity step.

The phase of the received baseband signal at any point in the sector is determined by the phase of its two constituents, reference and main array. The two residual components after diversity consist of two such basic Doppler direction defining codes, all cross products having been removed. It was the interaction of these two, when present, which produced the residual error. It will be seen from an understanding of the prior art and the foregoing discussion, that if either reference or array phase can be changed differentially for direct and multipath signals this will result in the possibility of phase cycling and consequent averaging of the last aforementioned component. The least complex approach to this involves programmed movement of the reference, any lateral movement thereof causing a different change of phase to the laterally separated multipath code compared with the direct code, assuming sufficient averaging.

Lateral movement of the reference with respect to the array must not be permitted during the scan as this will destroy the necessary coherence between angular coded signal and reference in the guidance axis. It is permissible however to change the lateral separation of reference and array on successive scans while keeping it constant during each individual scan cycle as the diversity sequence of the pair is completed, and use is made of that fact. The phase of the $\rho^2$ component will then change between scans and a very useful reduction of this already small error producing element may be achieved by averaging over a number of scans, e.g. 6 or 8 scans.

FIG. 3 of the accompanying drawings shows implementation of this further diversity according to the invention for a vertical guidance array wherein there is a coordinate array 9 of $m \times n$ possible positions for the commutated antenna elements, and an associated horizontal array of $p$ reference elements, where $p > m$. The $m \times n$ positions are not all actually utilized and in view of the two-source nature of this Doppler system, one element per row may well be sufficient in many cases. Thus, the main array may be thinned, and the number $q$ of elements in the array will therefore generally be less than $m \times n$. A first frequency $f_1$ from source 5 is commutated to the co-ordinate array 9 in the same sequence for each scan so that at each step of the scan a successively higher one of the $q$ elements is energized, this being indicated by the location (vertical spacing) of the number 1 to 5 for the first five steps of the scan.

An offset frequency $f_2$ from 6 is commutated to the reference elements so that, within each scan, the numerical sequence of the energization of the reference antenna conforms with that of the array sequence in respect to the horizontal pseudo-random movement thereof, being indicated for scan *a* by correspondingly identified numerals 1*a* to 5*a* for scan *b* by 1*b* to 5*b* and for scan *c* by 1*c* to 5*c*. That is the horizontal (lateral) spacing between the driven main array and reference array element at any time is constant.

This double diversity scanning format is equally applicable to an antenna array used in an inverse Doppler direction finding system in which the commutated array receives rather than transmits.

The RF source 5 and offset device 6 are well known in this art, and array commutator 8 is readily constructed as a programmed R.F. switching to provide the program of excitation of the elements of array 9 as described. Note that, on FIG. 3 the excited elements progress in *n* position by one step at a time, whereas the M positions are interlaced such that, in the example given, the M position goes from a first (1) element to the right four positions, back to the 1st + 1 *m* position and thence right four more positions, etc. This pseudo-random *m* program occurs as the *n* program of step-by-step occurs synchronously. The structural arrangement of commutator 8 is evident from this information.

The connection 12 serves to notify the switch 10 of the beginning of each scan cycle of array 9. The switch 10 merely moves back and forth the element group to which the pseudo-random programs dictated by 7 applies. The structures of 7 and 10 are therefore evident from those requirements. In order for the back-and-forth shift of the pseudo-random program applied to ref. array 11 to be possible, it will be seen that $p > m$ is necessarily true.

The remote (airborne) receiving station is no different in concept than it would be with ground beacon arrangements of the hereinbefore discussed prior art systems of the same general type.

What is claimed is:

1. Radio direction finding apparatus for navigational angle determination comprising:
    a first antenna array having a plurality of separately excitable first elements arranged in a two-dimensional pattern in *n* positions in the coordinate of measurement of said navigational angle and *m* coordinate positions orthogonal thereto, said first elements lying in a first array plane and occupying at least a portion of the element positions thereby defined, where *q* is the product of *m* and *n*;
    a second antenna array having a plurality of separately excitable second elements *p*, where $p > m$ arranged in a line substantially parallel to a line of said *m* element positions;
    first means for energizing said first elements in a program in which the energized element during each successive element dwell time is advanced in said *n* coordinate position linearly as a function of time, the *m* position of said element energized at any time being simultaneously controlled as to *m* position according to a pseudo-random program;
    second means for successively energizing a contiguous group of said second elements comprising the same number of said second elements as are energized in each scan cycle within said first array, said energization of said second elements being effected according to a program whereby the lateral spacing between the first array element and the second array element remains constant throughout each of said scan cycles;
    and third means operatively associated with said second means for varying the location of said contiguous group elements among said *p* elements of said second array which are energized by said second means for each successive scan cycle, said location remaining constant during each scan cycle.

2. Apparatus according to claim 1 in which said third means comprises means for varying said location of said contiguous group of elements according to a pseudo-random program.

3. Apparatus according to claim 1 in which said first antenna array is thinned in that fewer of said *q* element positions contain said antenna elements, said first means program being such as to energize only said antenna elements actually extant in said first array.

4. Apparatus according to claim 3 in which said third means comprises means for varying said location of said contiguous group of elements according to a pseudo-random program.

5. Apparatus according to claim 2 in which said first antenna array is thinned in that fewer of said *q* element positions contain said antenna elements, said first means program being such as to energize only said antenna elements actually extant in said first array.

6. Apparatus according to claim 1 in which said first means includes a first radio frequency source at a first frequency and said second means includes a second radio frequency source, said second source being at a frequency offset by a predetermined amount from said first frequency, said second frequency being phase coherent with respect to said first frequency.

* * * * *